United States Patent [19]
Smith

[11] 3,741,456
[45] June 26, 1973

[54] GAS PROPORTIONING AND PRESSURE CYCLING APPARATUS FOR WELDING EQUIPMENT

[75] Inventor: Francis E. Smith, Scotch Plains, N.J.

[73] Assignee: Airco, Inc., Murray Hill, New Providence, N.J.

[22] Filed: May 20, 1971

[21] Appl. No.: 145,377

[52] U.S. Cl. .................. 228/41, 137/88, 228/42
[51] Int. Cl. .................................... B23k 1/00
[58] Field of Search .................. 48/184; 137/7, 88; 228/41, 42; 29/494

[56] References Cited
UNITED STATES PATENTS

| | | |
|---|---|---|
| 3,598,134 | 8/1971 | Ollivier .................................. 137/7 |
| 1,619,948 | 3/1927 | Mangiameli .......................... 48/184 |
| 1,539,630 | 5/1927 | Beaird .................................. 48/184 |

Primary Examiner—J. Spencer Overholser
Assistant Examiner—Robert J. Craig
Attorney—Larry R. Cassett, H. Hume Mathews and Edmond W. Bopp

[57] ABSTRACT

A gas mixing system for mixing a plurality of different gases wherein all the inlet means for the various gases are controlled simultaneously by a bistable pressure responsive device mechanically coupled thereto.

12 Claims, 3 Drawing Figures

PATENTED JUN 26 1973 3,741,456

INVENTOR
FRANCIS E. SMITH
BY Jerry R. Cassett
ATTORNEY

GAS PROPORTIONING AND PRESSURE CYCLING APPARATUS FOR WELDING EQUIPMENT

BACKGROUND OF THE INVENTION

The invention relates to apparatus for mixing two or more gases such as oxygen and argon in given proportions for industrial applications such as welding or for any use where gas mixtures are needed and is particularly useful in connection with gas demand proportioners. By definition, a demand proportioner is apparatus for mixing gases in predetermined proportions and supplying such mixed gases at any required flow rate within the rated capacity of the apparatus.

An essential part of any gas proportioner is the arrangement for pressure cycling wherein a mixing tank or chamber receives the different gases at required respective flow rates. A control system admits the gases to the chamber by pressure regulated valves according to the pressure within the chamber. Heretofore, this part of the proportioner as used commercially, generally comprised a mixing tank downstream of solenoid operated valves and metering orifices. A pressure sensing device in the tank produced electrical signals for operating the solenoid valves. In practice, this apparatus is complicated and expensive due to the solenoid valves, electrical switching control system requirements, valve piping connections, physical dimensions of the equipment, etc. Consequently, a demand proportioner of this character is costly to install, is a potential explosion hazard in some cases, and moreover lacks flexibility as regards quick relocation where different work sites are involved.

The present invention is concerned with improved demand proportioning equipment that is simple, compact and adapted for inexpensive portable equipment, and that is not dependent on an electrically operated valve system.

SUMMARY OF THE INVENTION

In accordance with the invention, a mechanically operated pressure cycling device, in which the different apportioned gases are initially mixed, is advantageously incorporated in demand proportioning equipment designed as a compact, portable unit. A surge tank for further gas mixing and pressure stabilization during variable demand flow, and a pressure regulator at the outlet of the surge tank for final pressure adjustment of the working mixture essentially complete the unit. The pressure cycling device constitutes a self-contained, compact and entirely mechanical assembly.

Specifically, the cycling device meters the individual gases that are supplied at controlled pressure, and directs the metered flow into a common chamber through respective valve-regulated inlet passages. The chamber is in communication with a pressure responsive means, such as a diaphragm, and in a preferred form of the invention has an outlet passage leading to a surge tank. Gas inlet flow is interrupted according to chamber pressure by series located, non-throttling valves, one for each inlet passage. The diaphragm causes opening of the inlet valves under a spring bias that is effective upon decrease of chamber pressure acting on the diaphragm. As the chamber pressure tends to drop when gas is drawn from the chamber outlet according to demand, the diaphragm responding thereto opens the inlet valves for admitting the higher pressure gases to the chamber. The inlet valves are spring biased to shut off incoming gas flow with depression of the diaphram, i.e., when the desired chamber pressure is restored. For insuring positive action of the diaphram with corresponding positive, fast and non-throttling bi-stable positioning of the valves, the diaphram has an armature that is positioned between a pair of permanent magnets for snap action between the two limiting positions.

A principal object of the invention therefore, is to provide improved gas mixing equipment, and in particular a gas demand proportioner that is simple, compact and inexpensive in construction and that is readily portable for extensive use.

A related object is to provide in gas mixing equipment of the kind above, an improved pressure cycler unit that is self-contained, light in weight, not subject significantly to wear or fatigue, and that is positive, efficient and entirely mechanical in operation.

Other objects, features and advantages will appear from the following description with reference to the accompanying drawings.

DESCRIPTION OF PREFERRED EMBODIMENT

Figure 1:
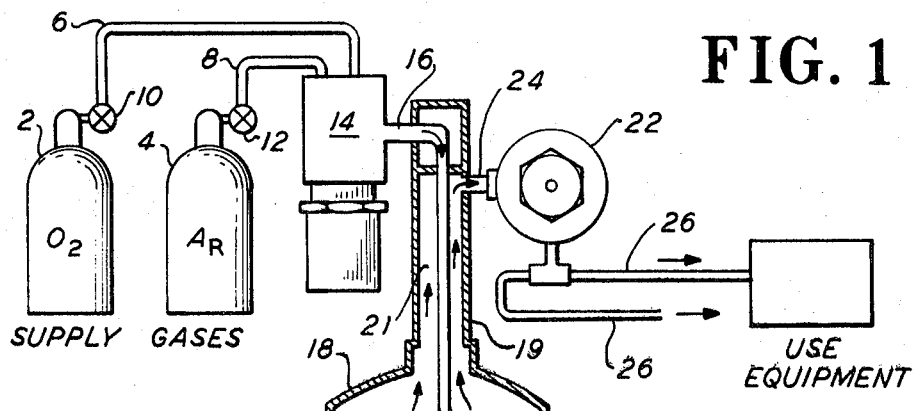
FIG. 1 illustrates a gas demand proportioning system embodying the invention.

The demand proportioning system shown in FIG. 1 comprises in the present example an arrangement for mixing two gases, oxygen and argon, in desired proportions for supplying welding equipment or the like. In practice, the gases may be stored in conventional high pressure cylinders such as 2 and 4, and the outlet lines 6 and 8 are maintained at a suitable pressure, such as 100 psig by pressure regulators 10 and 12 respectively. The different gases are fed to a pressure cycler indicated at 14 and the initially mixed gases flow from the cycler outlet 16 at a flow rate as determined by the cycler, into a surge or flow stabilizing tank 18 where the gases are further thoroughly mixed.

The surge tank in the example shown is of easily manageable size, e.g., 1 cu. ft., and functions very efficiently for stabilizing a demand flow rate ranging from zero to 400 CFH with the gas supply in lines 6 and 8 at about 100 psig. The surge tank pressure ordinarily varies between 40 and 60 psig.

For insuring complete gas mixing before use, the extension of the cycler outlet 16 is vented as shown at 20 near the bottom of the surge tank. The outlet of the tank comprises a vertical tubular extension 19 that defines with the inlet tube 20 an annular passage 21 leading to a pressure regulator 22 through a lateral passage 24. The pressure regulator 22 is connected to the outlet line (or lines) 26 to equipment at the point of use as indicated, and serves to maintain a uniform pressure of the gas mixture notwithstanding variation in flow demand.

In the apparatus so far described the pressure cycler unit 14 performs a proportioning and mixing function that is supplemented by the surge tank 18 and pressure regulator 22 for stabilizing demand flow of the gas mixture at the desired working pressure. In practice, the cycler 14, surge tank 18 and pressure regulator 22 constitute a compact and integrated portable unit with the cycler and pressure regulator being conveniently mounted as shown on the vertical tubular extension 19 of the surge tank.

Figure 2:
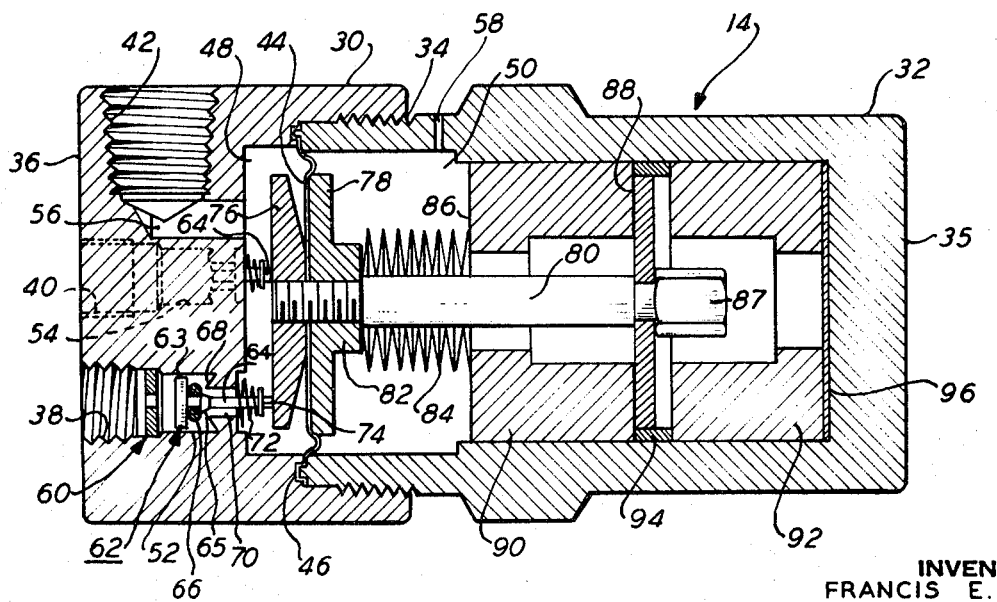
FIG. 2 is a sectional view of the mechanical pressure cycler shown in FIG. 1.

Referring now to FIG. 2 for a detailed illustration of the pressure cycler 14, the cycler housing comprises two cylindrical members 30 and 32 that are united as by screw thread engagement at 34. The member 30 at its end wall 36 has in the present instance two gas inlet openings 38 and 40 for fitting with the gas lines 6 and 8 respectively, of FIG. 1. The sidewall has a single gas outlet or discharge opening 42 for fitting with the cycler outlet line 16 of FIG. 1. As shown, a pressure responsive device comprising a diaphragm 44 is clamped at its periphery 46 between the cylindrical members for defining two chambers 48 and 50 within the housing. The chamber 48 is in communication with the inlet openings 38 and 40 through valve controlled passages 52 and 54 for initial gas mixing as presently described, and with the discharge opening 42 directly through passage 56. The chamber 50 is closed at its opposite ends by the diaphragm 44 and end wall 35 respectively, and is kept at ambient pressure by a vent opening 58. It will be apparent that the pressure responsive device may consist of a piston or the like, suitably biased and guided in the housing.

For controlling proportioning and admission of the gases to chamber 48, a flow rate controlling orifice plate 60 and sealing valve 62 are located in series relation as indicated within each inlet passage. The inlet flow control passages are similar, and it will be sufficient to describe specifically the cylindrical passage 52. The orifice plate 60 is removably positioned for easy replacement within the passage and is selected for the desired flow rate of that line. The orifice plate is advantageously positioned a short distance upstream from the series related inlet valve 62 for reducing to a practical minimum the gas volume between these parts. Valve 62 comprises a disclike member 63 connected to a valve stem 64 and has peripheral "flats" as shown for permitting flow of gas around the disc. A resilient 0-ring seal 66 is positioned between the disc and a shoulder 65 on the stem for seating the ring on a circular lip or valve seat 68 that leads to the chamber entrance passage 70. The valve is normally biased towards its seat for closing the passage 70 by a spring 72 that is compressed between the end wall 36 and a retainer 74 on the valve stem. Briefly, opening of the valve is caused by the diaphragm moving against the valve stem extension and forcing the valve inward and away from its seat 68 against the bias of spring 72. The diaphragm in this mode is operated according to spring forces acting thereon as presently described.

The diaphragm has secured thereto at its opposite sides pressure plates 76 and 78 respectively, that are threaded on one end of a centrally positioned operating rod 80 for clamping the diaphram between the plates and forming a seal between the comparatively high and low pressure chambers 48 and 50. The contacting or actuating plate 76 is positioned for abutting engagement with the valve stems 64, and the pressure plate 78 has a central boss 82 for seating a "low-rate" spring 84 that is tensioned against a fixed seat at 86. Thus, the spring 84 is in opposition to the gas pressure in chamber 48 acting on the diaphragm. As shown, a preferred form of low-rate spring consists of a compound disheddisc or "Belleville" spring wherein the characteristic decreasing resistance to deflection lends itself to the desired operation of the diaphragm. The opposite end of the operating rod 80 has secured thereto by a nut 87 a magnet armature 88 that operates for bi-stable positioning of the diaphragm, between the pole faces of a pair of cylindrical permanent magnets 90 and 92. The magnets are spaced within the cylindrical housing section 32 by an insulating or non-magnetic ring 94 that also serves to space the armature from the housing. A disc or shim 96 may be positioned between the magnet 92 and end wall 35 for precise positioning of the magnets.

The permanent magnets 90 and 92 are in the general form of cylindrical bushings and are axially aligned within the non-magnetic housing 32. The non-magnetic spacing ring 94 is dimensioned for predetermined travel of the disc-like armature 88, and hence the actuating plate 76, for precise engagement and disengagement with the valve stems 64. For insuring positive and fast operation of the valves, the armature moves by snap action between the respective pole faces of the magnets according to the resultant of the various forces acting on the diaphram rod 80. Assuming for example, that the inlet valves are in the open position as shown in FIG. 2 with the armature held in corresponding position by magnet 90, the armature is released only when the magnet holding force of magnet 90 is overcome by a force representing the difference between the increasing gas pressure in chamber 48 and the spring force at 84. When this point is reached, the low rate spring 84 allows rapid release of the armature which after initial movement, is accelerated under attraction of the other magnet 92 to the opposite holding position. The resulting snap action provides for fast and positive closing of the inlet valves 63 for insuring a pressure seal at the respective valve seats.

When the pressure in the chamber 48 has decreased a predetermined magnitude due to downstream use of the gas, the spring force at 84 is sufficient at the decreased chamber pressure to overcome the magnetic attraction of magnet 92 and cause release of the armature 88, and its snap-action return to the position shown in FIG. 2. For reasons stated above, the snap-action causes the diaphragm actuating plate 76 to move the valve stems 64 instantly to their fully open positions for normal gas flow thereby precluding partially restricted flow and undesired chattering of the inlet valves.

The mechanical cycler of the invention is adapted for mixing more than two gases as required in desired proportions for industrial, medical or other uses. The additional gas or gases are admitted to the cycler through respective inlet control passages in the same manner as described above.

In another aspect of the invention the mechanical cycler 14 has special use without the need for the added equipment including a surge tank, etc. of a demand proportioning system. For example, in many mixed gas applications for a conventional single MIG-type welding gun with wire feed, only a fixed flow rate of shielding gas is required.

Figure 3:
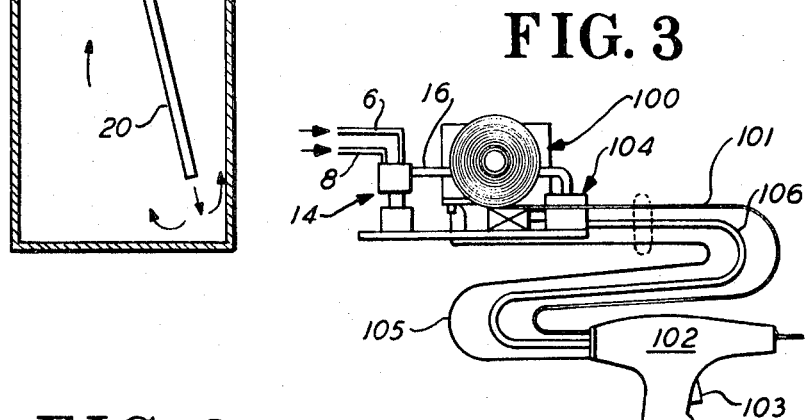
FIG. 3 is a fragmentary view illustrating another mode of practicing the invention.

In such case, referring to FIG. 3, the compact, low mass mechanical cycler 14 can be advantageously incorporated in or located at the welding wire feeder 100 for supplying at constant rate mixed shielding gas directly to the gun 102. Thus, when the gun trigger 103 closes a wire feed control circuit partly indicated at 105, it starts feed of the welding wire 101 and also causes the conventional solenoid control valve 104 to open. The shielding gas then flows at a constant rate and mixture by way of cycler outlet line 16, valve 104 and tube 106 into the gun and welding zone; when the valve is closed, the immediate build up of pressure in the cycler chamber 48 causes the gas inlet valves 66 to close as described above. Flow surge occurs to some extent upon reopening the control valve; however, the surge does not exceed that of more expensive and complicated conventional systems. Accordingly, the direct use of the mechanical cycler with a single wire feeder has advantages including reduced size and weight and lower cost.

Desired changes in flow rates of different gas mixtures are provided by the easily replaceable orifice plates 60 in the inlet passages, FIG. 2; thus the mechanical cycler is readily adaptable to supply not only any desired constant flow at a given mixture directly to a single welding unit, etc. as in FIG. 3, but also to function efficiently for a given gas mixture and variable flow within a rated flow capacity in the demand proportioner of FIG. 1.

In summary, it will be seen that the simplified mechanical cycler of the invention has considerable flexibility in its application to controlled gas mixing and use of the gas mixture. The cycler's small size and weight, in fact, make possible a portable demand proportioner of moderate capacity and low cost that heretofore was not available in the art; also, where used for direct constand flow feed to a single unit, as in FIG. 3 for example, where it is incorporated in a wire feeder for a welding gun, considerable savings can be realized in the resulting simplified, light weight, easily moveable and more convenient equipment, as compared with conventional larger and more expensive systems.

Having set forth the invention in what is considered to be the best embodiment thereof, it will be understood that changes may be made in the system and apparatus as above set forth without departing from the spirit of the invention or exceeding the scope thereof as defined in the following claims.

Having thus described my invention, what I claim as new and desire to acquire by Letters Patent of the United States is:

1. In a gas mixing system having a plurality of pressure regulated sources of different gases, a pressure cycler for controlling output feed of the mixed gases comprising
   a. a housing having a mixing chamber with an inlet passage for each of the different gases, and a chamber outlet passage for the mixed gases,
   b. means for separately controlling the gas flow rates in the inlet passages respectively,
   c. a pressure cycling valve for each inlet passage,
   d. a pressure responsive device subject to the mixing chamber pressure for mechanically controlling the aforesaid valves,
   e. resilient means for biasing the device upon given decrease of the chamber pressure from a limit position representing valve closure to an opposite limit position for opening the valves, and
   f. bi-stable positioning means operatively connected to the device for applying limited holding force thereto at its limit positions respectively, for ensuring non-throttling action of the inlet valves.

2. Apparatus as specified in claim 1 wherein the pressure responsive device is a diaphragm that is spring biased upon predetermined decrease in chamber gas pressure for overcoming the limit position holding force and for mechanically engaging and opening the inlet valves.

3. Apparatus as specified in claim 1 wherein the inlet valves are independently biased closed when increase in chamber pressure overcomes the combined device bias and limit holding force.

4. Apparatus as specified in claim 1 wherein the inlet valves and the pressure responsive device have follow-up abutting means for opening the valves.

5. Apparatus as specified in claim 2 wherein the bi-stable positioning means comprises a pair of permanent magnets spaced to represent the limit positions.

6. Apparatus as specified in claim 5 wherein an armature positioned for reciprocal movement between the magnets is connected to the diaphragm.

7. Apparatus as specified in claim 1 wherein the respective flow rate controlling means are easily replaceable orifice plates within the inlet passages and the corresponding orifice plate and valve are closely spaced within each inlet passage.

8. Apparatus as specified in claim 1 wherein the resilient biasing means constitutes a low rate spring of the multiple compound disc type.

9. Apparatus as specified in claim 1 wherein a surge tank is connected to the outlet passage of the mixing chamber and a working-pressure regulator for the gas mixture is connected to the outlet of the surge tank, the pressure cycler housing and the pressure regulator being integrally mounted on the surge tank to constitute a portable demand proportioner assembly.

10. Apparatus as specified in claim 9 wherein the surge tank has a vertical dome on which the cycler housing and pressure regulator are mounted, and the mixing chamber outlet passage has an extension for directing the gases into the lower part of the surge tank for further mixing.

11. Apparatus as specified in claim 1 wherein the chamber outlet passage for the mixed gases is directly connected to equipment using a constant flow rate of the gases.

12. Apparatus as specified in claim 11 wherein the constant flow rate equipment is a wire-feed welding gun and the cycler housing is mounted on the welding wire feeder.

* * * * *